United States Patent
Micusik et al.

(10) Patent No.: US 11,843,418 B2
(45) Date of Patent: Dec. 12, 2023

(54) DC AND OFFSET CANCELLATION FOR FULLY DIFFERENTIAL OPTICAL RECEIVER

(71) Applicant: Cisco Technology, Inc., San Jose, CA (US)

(72) Inventors: Daniel Micusik, Nuremberg (DE); Sachidanandam Sundarraju, Nuremberg (DE); Jan Sundermeyer, Nuremberg (DE); Juergen Hauenschild, Bochum (DE)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 17/476,969

(22) Filed: Sep. 16, 2021

(65) Prior Publication Data

US 2023/0084591 A1    Mar. 16, 2023

(51) Int. Cl.
*H04B 10/69*    (2013.01)

(52) U.S. Cl.
CPC .................... *H04B 10/69* (2013.01)

(58) Field of Classification Search
CPC ...................................... H04B 10/69
USPC ........................................ 398/115
See application file for complete search history.

(56) References Cited

U.S. PATENT DOCUMENTS

| | | | |
|---|---|---|---|
| 7,324,035 B2* | 1/2008 | Harris | H03M 1/60 341/157 |
| 9,148,094 B1* | 9/2015 | Swoboda | H03F 3/08 |
| 10,498,461 B1* | 12/2019 | Vera Villarroel | H03F 3/45475 |
| 2003/0164731 A1* | 9/2003 | Yoon | H03F 3/505 330/9 |
| 2009/0323864 A1* | 12/2009 | Tired | H03D 7/145 375/319 |
| 2010/0254711 A1* | 10/2010 | Miller | H04B 10/6932 398/136 |

(Continued)

FOREIGN PATENT DOCUMENTS

EP    3297184 A1 *  3/2018 ............. H03F 3/087

OTHER PUBLICATIONS

Eduard Säckinger, "Broadband Circuits for Optical Fiber Communication," Wiley-Interscience; 1. edition, Apr. 8, 2005, pp. 203-207.

(Continued)

*Primary Examiner* — Abbas H Alagheband
(74) *Attorney, Agent, or Firm* — Edell, Shapiro & Finnan, LLC (57) ABSTRACT

A method and apparatus that cancels or reduces DC offset in a fully-differential optical receiver. The method includes receiving differential optical signals, converting, with photodetectors, the differential optical signals to differential current signals representative of the differential optical signals, converting, using a transimpedance amplifier, the differential current signals to differential intermediate voltage signals, amplifying, using a main amplifier, the differential intermediate voltage signals to generate differential output voltage signals, and cancelling a DC component of the differential output voltage signals using a fully differential DC cancellation circuit. Output offset may also be cancelled or reduced using digital control.

14 Claims, 5 Drawing Sheets

(56) References Cited

U.S. PATENT DOCUMENTS

| | | | | |
|---|---|---|---|---|
| 2011/0163233 A1* | 7/2011 | Ng | ............................ | G01J 1/28 |
| | | | | 250/341.8 |
| 2012/0121273 A1* | 5/2012 | Ito | ........................... | H03F 3/087 |
| | | | | 330/252 |
| 2012/0141122 A1* | 6/2012 | Carusone | ........... | H04B 10/6971 |
| | | | | 398/37 |
| 2013/0271217 A1* | 10/2013 | Doany | ................ | H03F 3/45179 |
| | | | | 330/259 |
| 2019/0123726 A1* | 4/2019 | Ray | ...................... | H03K 5/2418 |
| 2019/0173588 A1* | 6/2019 | Ahmed | ................ | H04B 10/693 |
| 2020/0091881 A1* | 3/2020 | Lim | .................... | H03F 3/45475 |
| 2020/0235820 A1 | 7/2020 | Vera Villarroel et al. | | |
| 2020/0235823 A1* | 7/2020 | Murphy | ............... | H04B 10/616 |

OTHER PUBLICATIONS

Eduard Säckinger, "Analysis and Design of Transimpedance Amplifiers for Optical Receivers," Wiley; 1. edition, Dec. 12, 2017, pp. 373-396.

\* cited by examiner

DC AND OFFSET CANCELLATION FOR FULLY DIFFERENTIAL OPTICAL RECEIVER

TECHNICAL FIELD

The present disclosure relates to a fully-differential optical receiver.

BACKGROUND

An optical receiver processes a received optical signal, which may have been modulated in amplitude, phase, polarization or a combination thereof. The optical signal is demodulated using a transducer, e.g., a photodiode or photodetector, that converts the optical (light) signal to a corresponding electrical signal. The electrical signal is thereafter processed to extract information that was contained in the original optical signal. The maximum to minimum optical power, i.e., the dynamic range, together with the transducer, define the received electrical signal dynamic range. Modern communication systems use complex modulation schemes, e.g., quadrature modulation, to increase the communication channel efficiency. The efficiency of complex modulation schemes is proportional to the maximum operation frequency, i.e., baud rate, and dynamic range.

As noted, in an optical receiver optical signals are converted to electrical current. In most cases, the current magnitude, which is proportional to the received optical power, is amplified to be useful for follow-on circuitry. Typically, during amplification, the electrical current (current) is converted to a voltage using a transimpedance amplifier. Operation and control of the transimpedance amplifier and a follow-on main amplifier, together with the bias circuits for proper operation, are challenging. And, when the optical receiver is a configured as a differential optical receiver, the design is even more challenging.

DESCRIPTION OF EXAMPLE EMBODIMENTS

Overview

Presented herein is a method to that cancels or reduces DC offset in a fully-differential optical receiver. The method includes receiving differential optical signals, converting, with photodetectors, the differential optical signals to differential current signals representative of the differential optical signals, converting, using a transimpedance amplifier, the differential current signals to differential intermediate voltage signals, amplifying, using a main amplifier, the differential intermediate voltage signals to generate differential output voltage signals, and cancelling a DC component of the differential output voltage signals using a fully differential DC cancellation circuit. Output offset may also be cancelled or reduced using digital control.

In another embodiment, an apparatus is provided. The apparatus includes a pair of photodetectors, a transimpedance amplifier in communication with the photodetectors, a main amplifier in communication with the transimpedance amplifier, and a fully-differential DC cancellation circuit in communication with an output of the main amplifier, the fully differential DC cancellation circuit comprising a pair of transistors that, responsive to an output of the main amplifier, shunts DC photocurrents of the photodetectors away from an input to the transimpedance amplifier.

Example Embodiments

For proper operation, a fully-differential (FD) optical receiver relies on a wide dynamic range DC and output-offset cancellation (DOC) mechanism to reliably process the two photocurrents generated by two independent photodetectors. These photocurrents usually have different DC values caused by the mismatch in the optical signal paths or by the mismatch between the photodetectors. Because the signal information is usually contained in the AC portion of the photocurrents, it is preferable to remove the DC component at the input of the FD optical receiver such that that DC component does not enter the high-frequency signal path. Additionally, the offset signal at the receiver output is preferably cancelled, as well, to balance the differential signal path.

Figure 1:
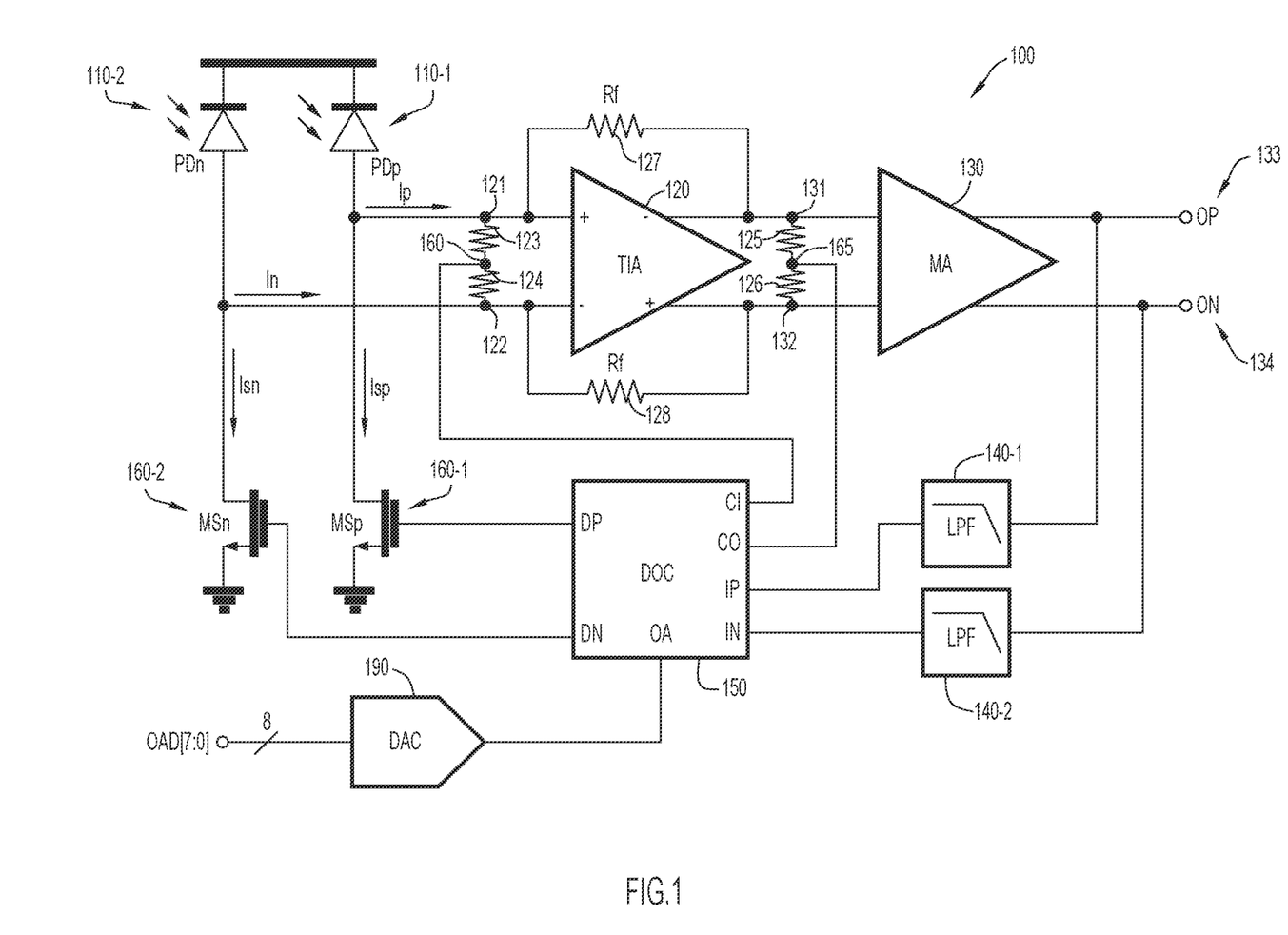
FIG. 1 shows a schematic diagram of a fully-differential optical receiver, according to an example embodiment.

Reference is now made to FIG. 1, which shows a schematic diagram of a fully-differential optical receiver 100, according to an example embodiment. Photodetectors (PD) PDp 110-1 and photodetector PDn 110-2 are responsive to an incoming differential optical signal and generate currents Ip and In, respectively, that are supplied to the differential input nodes 121, 122 of transimpedance amplifier (TIA) 120, which is fully-differential. An input-side voltage divider, spanning differential input nodes 121, 122, comprising resistors 123, 124 senses the common-mode voltage of the differential input nodes 121, 122. TIA input common-mode voltage CI (common-mode input) is detected and received from node 160 between resistors 123, 124 and supplied to a DC output-offset cancellation (DOC) circuit 150, which is described in detail with reference to FIG. 2. Outputs of the TIA 120 are connected to input nodes 131, 132 of a main amplifier (MA) 130. An output-side (with respect to the TIA 120) voltage divider, spanning input nodes 131, 132, comprising resistors 125, 126 senses the common-mode voltage at the input nodes 131, 132 of MA 130 (i.e., the outputs of the TIA 120). TIA output common-mode voltage CO (common-mode output) is detected and supplied from a node 165 between resistors 125, 126 to the DOC circuit 150. Feedback resistors Rf 127, Rf 128 feed back an output of the TIA 120 (i.e., from input nodes 131, 132) to its input (i.e., differential input nodes 121, 122).

MA 130 has outputs OP 133 and ON 134. Respective voltage feedback signals are supplied from OP 133 and ON 134, via low pass filters 140-1, 140-2, to IP input and IN input of DOC circuit 150. DOC circuit 150 generates output DP and output DN to control shunt transistors MSp 160-1 and MSn 160-2, respectively. MSp 160-1 and MSn 160-2 are arranged to shunt DC photocurrents (Isp, Isn from Ip, In), generated by the photodetector PDp 110-1 and photodetector PDn 110-2 to ground in accordance with outputs DP and DN of DOC circuit 150 to remove DC offset from each line individually.

Also provided is an offset adjustment (OA) input for DOC circuit 150 which may be used to further fine tune the residual offset voltage of the fully-differential optical receiver 100. OA input may be driven by a digital-to-analog converter (DAC) 190 with, e.g., an 8-bit resolution (offset adjustment digital (OAD)).

Figure 2:
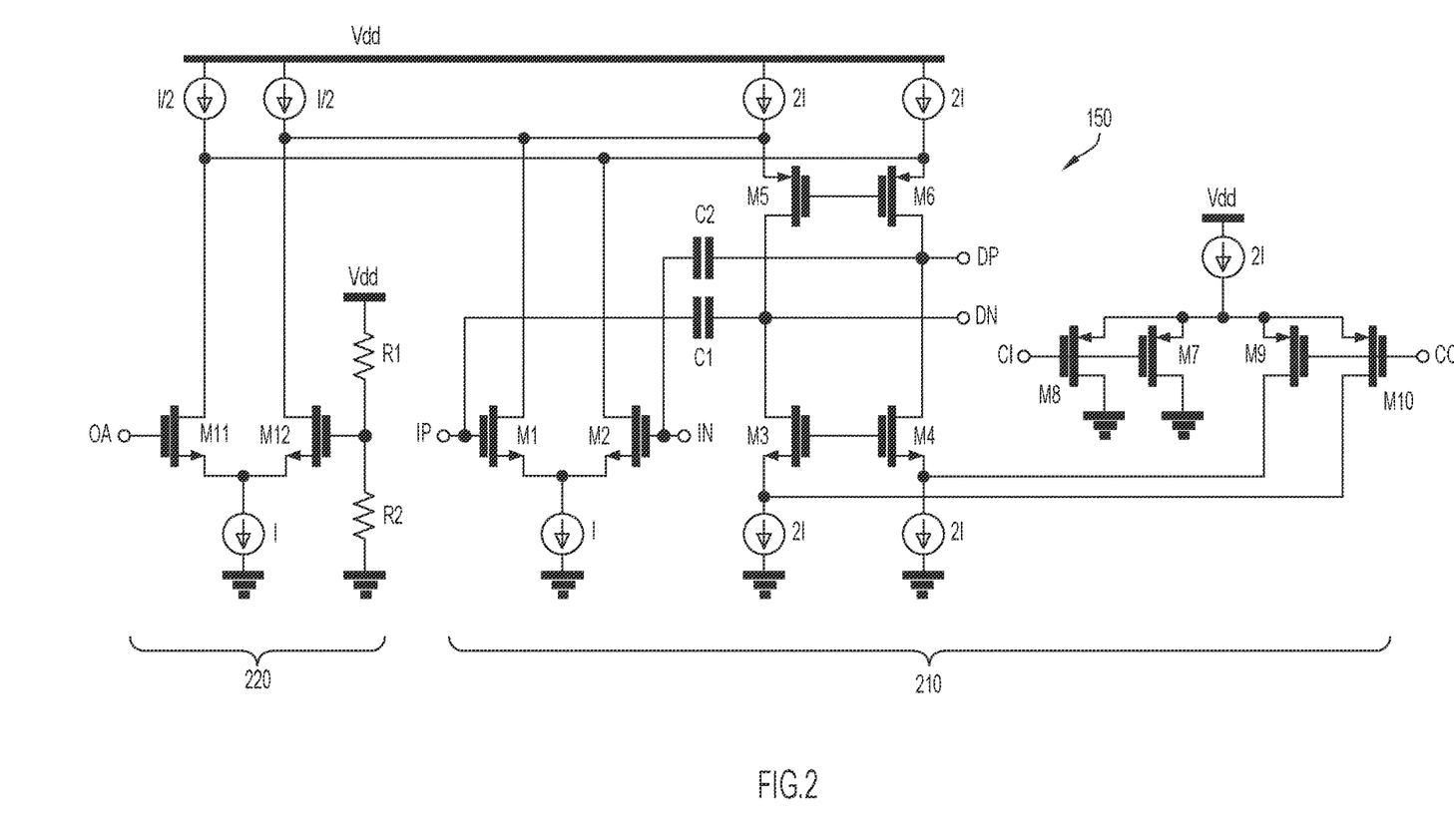
FIG. 2 shows a schematic diagram of a DC offset cancellation circuit of the fully-differential optical receiver, according to an example embodiment.

FIG. 2 shows a schematic diagram of the DOC circuit 150 of the fully-differential optical receiver 100, according to an example embodiment. DOC circuit 150 may comprise two sections: input and output DC cancellation section 210 and residual offset-voltage adjustment section 220.

As is seen in the figure, input and output DC cancellation section 210 includes differential transistor pair M1, M2 that is controlled by inputs IP and IN, which are indicative of the outputs OP 133, ON 134. CI and CO control transistors M7, M8, M9, M10, which are used to adjust the common-mode voltage of the output voltage signals DP and DN. Transistors M3, M4, M5, M6 are used to drive the outputs DP and DN, which in turn control shunt transistors MSp 160-1 and MSn 160-2. Capacitors C1, C2 are used to time average the inputs IP and IN (i.e., the outputs OP 133, and ON 134).

Transistors M11 and M12 along with a voltage divider comprising resistors R1 and R2 make up residual offset-voltage adjustment section 220.

Both input and output DC cancellation section 210 and residual offset-voltage adjustment section 220 are powered from a rail voltage Vdd. The current sources and sinks depicted in FIG. 2 are designed to have a proper ratio, which is based on the tail current sink (I) of the differential pair M1-M2. In an embodiment, all current sources and sinks are matched. Depending on the available supply headroom they can be implemented as simple, stacked, or cascoded topology.

Operation of the circuits shown in FIGS. 1 and 2 is described below. Photodetector PDp 110-1 and photodetector PDn 110-2 are connected to the TIA 120, which converts the currents Ip, In from the photodetector PDp 110-1 and photodetector PDn 110-2 into a differential voltage. This signal is then amplified and buffered in the MA 130 so that the output differential voltage V(OP)–V(ON) achieves the appropriate peak-to-peak level when driving the load circuit, e.g., an analog-to-digital converter (ADC) (not shown). Because the photodetector PDp 110-1 and photodetector PDn 110-2 generate signals with DC and AC components, there is provided a mechanism that separates the DC component from the signal and allows only the AC portion to pass through the signal amplification path (TIA 120 and MA 130). DC cancellation is performed directly at the differential input nodes 121, 122 with shunt transistors MSn 160-2 and MSp 160-1, which are driven by the DOC circuit 150 shown in FIG. 2. With this arrangement, photocurrent generated by the photodetector PDp 110-1 and photodetector PDn 110-2 is shunted away for an input to the TIA 120.

The DOC circuit 150 senses a DC offset voltage at an output of MA 130 by subtracting the time-averaged values V(OP) and V(ON) from one another in the folded-cascode differential stage comprising transistors M1-M6. Time-averaging of V(OP) and V(ON) is accomplished using miller multiplication feedback capacitors C1 and C2, which control the low cut-off frequency of the cancellation loop. In response to the difference V(OP)–V(ON), the DOC circuit 150 regulates MSp 160-1 and MSn 160-2 so that the output offset voltage at OP 133, ON 134 becomes zero. The low pass filters 140-1, 140-2 isolate the high-frequency signal paths from the DOC circuit 150. Because the inputs and outputs of the DOC circuit 150 are fully differential, the common-mode voltage is, according to an embodiment, also regulated. This regulation is also performed fully differentially with transistors M7-M10, which regulate the outputs DP and DN so that the input and output common-mode voltages of the TIA 120 are equalized. This is the condition where there is no DC current flowing through the feedback resistors Rf 127, 128 and all the DC photocurrents Isp, Isn from the photodetector PDp 110-1 and photodetector PDn 110-2 are shunted by MSn 160-2 and MSp 160-1 to ground.

Further, and in accordance with an embodiment, to reduce to the imbalance in the signal path caused by the mismatch of the active and passive elements in the fully-differential optical receiver 100, a residual offset-voltage adjustment mechanism may also be provided in the DOC circuit 150, namely residual offset-voltage adjustment section 220. As shown, the residual offset-voltage adjustment section 220 may be controlled digitally with a low-speed 8-bit rail-to-rail DAC 190 by applying a selectable input voltage. The DAC 190 is connected to the offset adjustment (OA) input of the DOC circuit 150, which controls transistor M11 of the differential pair M11, M12. As shown, transistor M12 is biased with the voltage divider comprising resistors R1, R2 so that the residual offset-voltage adjustment section 220 can handle the full voltage output range of the DAC 190. In the case of a rail-to-rail DAC, this predetermined biasing, or set voltage, can be set in the middle between Vdd and ground by choosing R1=R2. This allows for equal covering of positive and negative adjustment range when the signal OA is swept between Vdd and ground. The residual offset-voltage adjustment section 220 controls source currents of the output stage M5-M6 with a selectable voltage via DAC 190, and thus introduces an imbalance into the differential output stage. This digitally-controlled imbalance in the output stage of the DOC circuit 150 enables fine tuning of the residual output offset voltage of MA 130. Of course, those skilled in the art will appreciate that direct analog control of the OA input of DOC circuit 150 could also be implemented.

Figure 3:
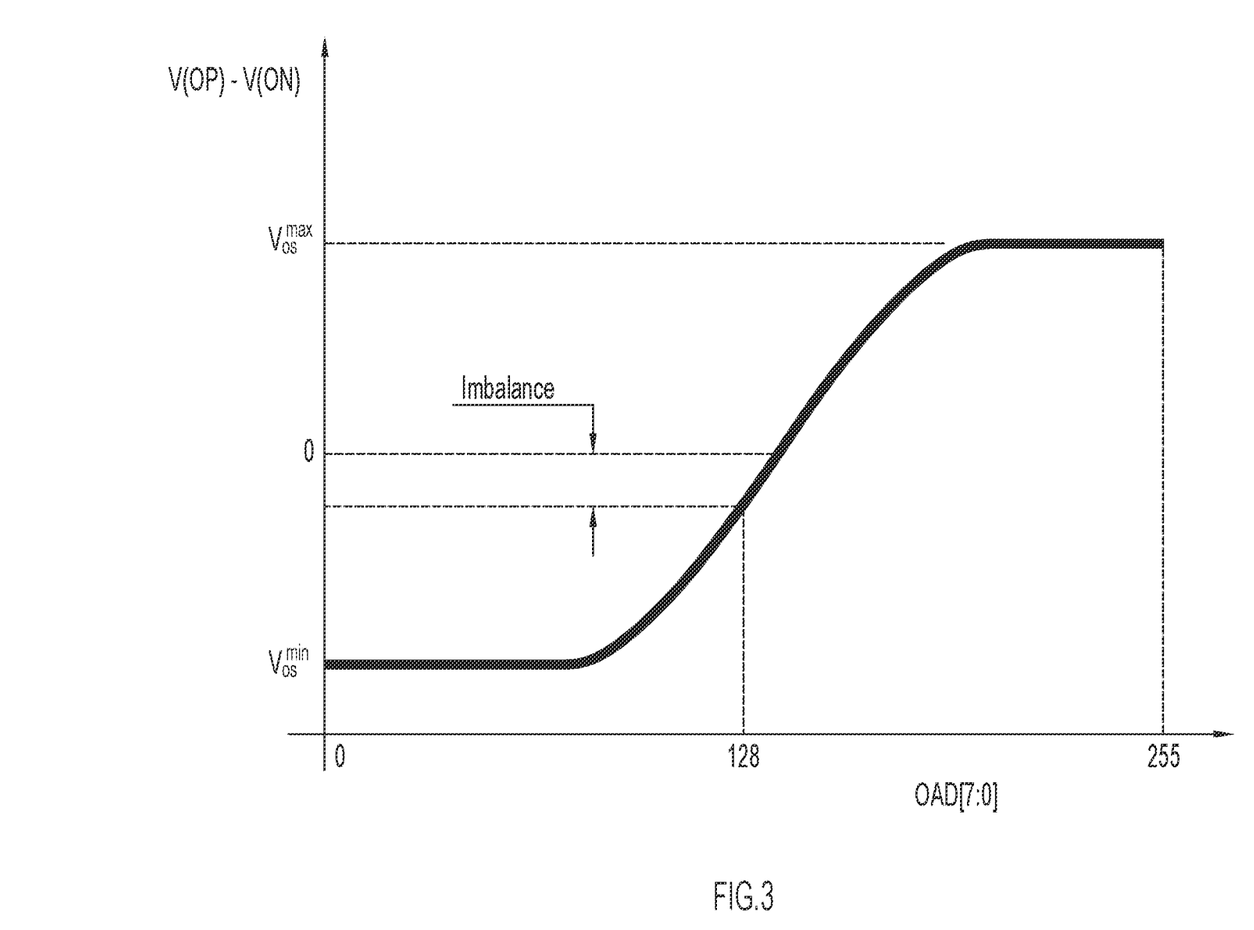
FIG. 3 is a graph that shows the effect of offset adjustment applied to the DC offset cancellation circuit, according to an example embodiment.

FIG. 3 is a graph that shows the effect of residual-voltage offset adjustment applied to the DOC circuit 150, according to an example embodiment. That is, FIG. 3 illustrates the effect of residual-voltage offset adjustment using an 8-bit rail-to-rail DAC, on the differential output voltage. Offset (os) can be adjusted between a Vos Max value and a Vos Min value.

Figure 4:
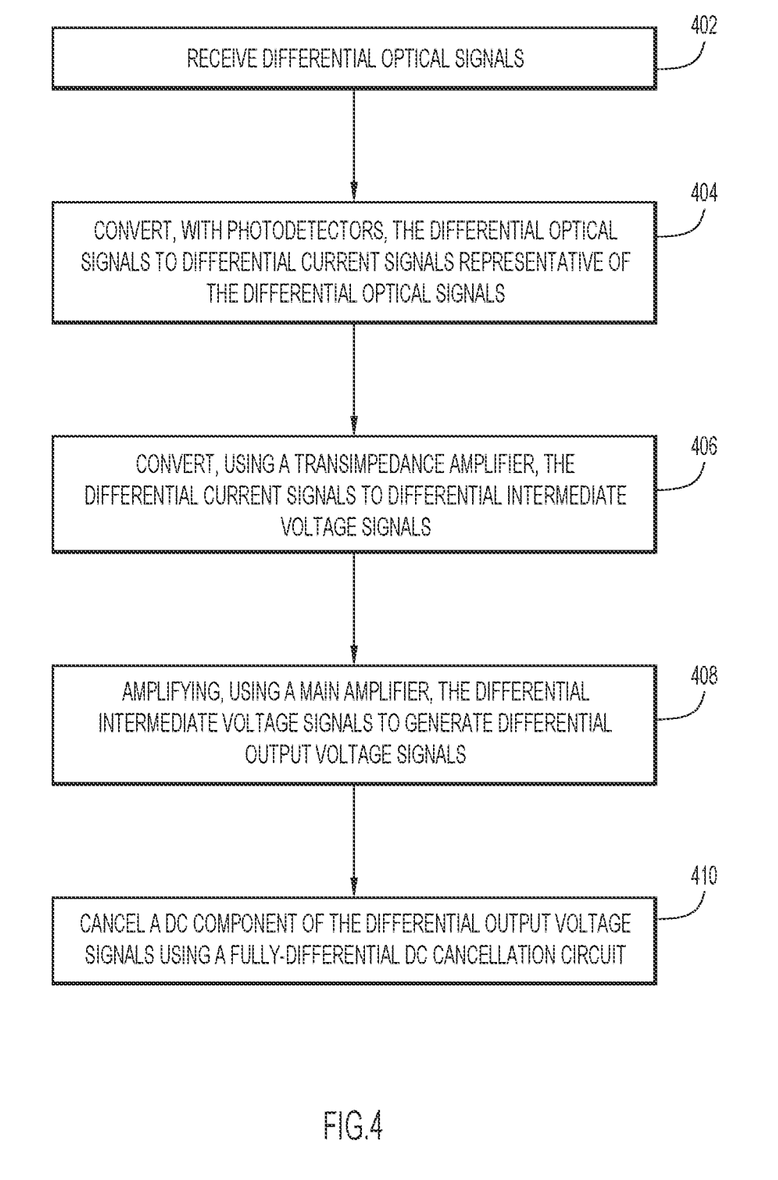
FIG. 4 is a flowchart showing a series of operations for operating a fully-differential optical receiver, according to an example embodiment.

FIG. 4 is a flowchart showing a series of operations for operating a fully-differential optical receiver, according to an example embodiment. At 402, an operation is configured to receive differential optical signals. At 404, those signals are converted, with photodetectors, to differential current signals representative of the differential optical signals. At 406, an operation is configured to convert, using a transimpedance amplifier, the differential current signals to differential intermediate voltage signals. At 408, the differential intermediate voltage signals are amplified, using a main amplifier, to generate differential output voltage signals. And, at 410, an operation cancels a DC component of the differential output voltage signals using a fully-differential DC cancellation circuit, e.g., the DOC circuit 150.

Thus, those skilled in the art will appreciate that the embodiments described herein simplify the complex problem of DC and output offset cancellation in a FD optical receiver using a fully differential solution. Such an arrangement improves the dynamic range of the cancellation and reduces the noise impact on the differential signal. Also, using an independent residual-voltage offset adjustment mechanism allows for fine tuning of the residual imbalance at the differential output of the FD optical receiver.

Figure 5:
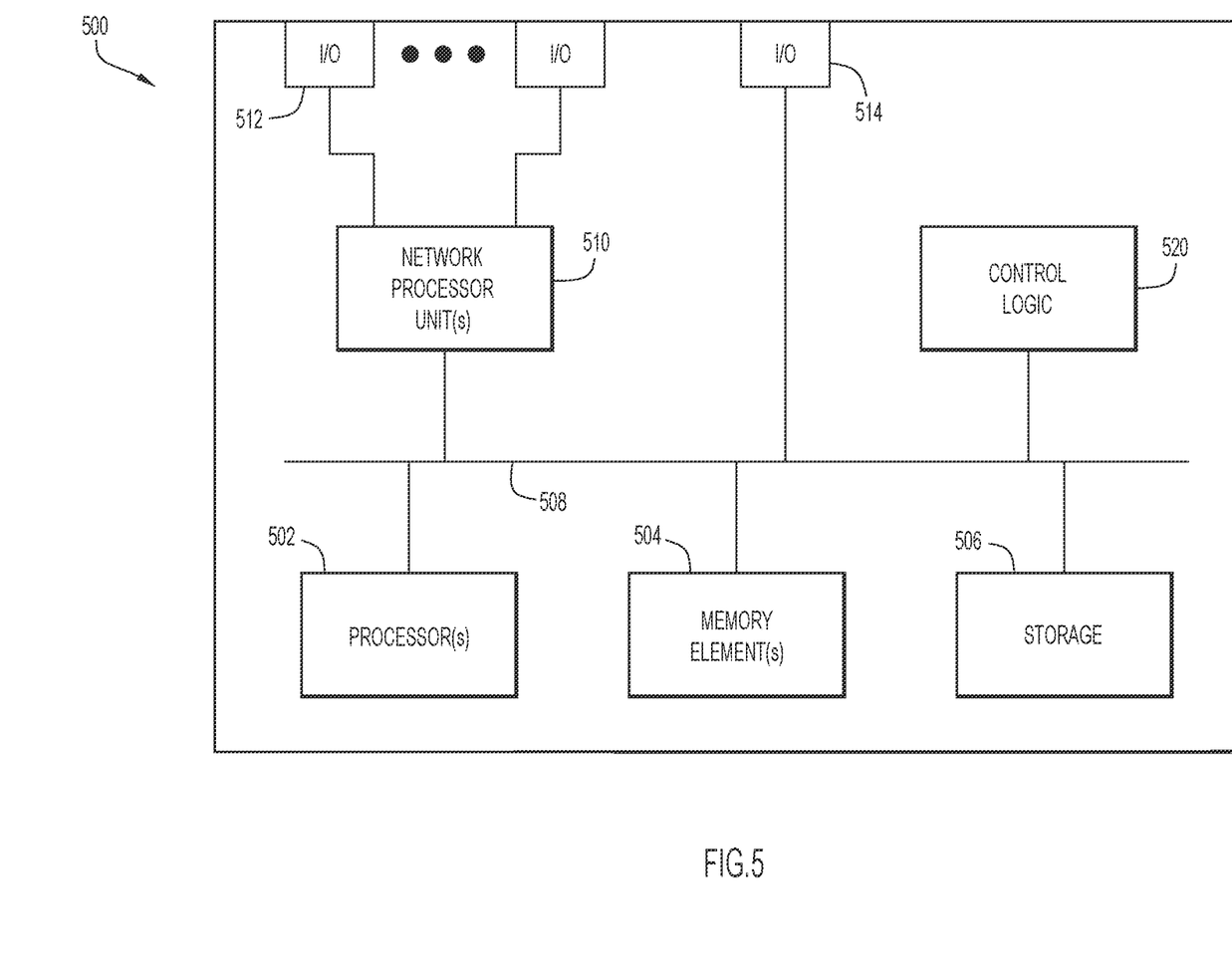
FIG. 5 illustrates a hardware block diagram of a computing device that may make use of the fully-differential optical receiver described herein, according to an example embodiment.

FIG. 5 illustrates a hardware block diagram of a computing device that may make use of the fully-differential optical receiver described herein, according to an example embodiment.

In at least one embodiment, the computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein. I/O interfaces 512, 514 may be make use of the fully-differential optical receiver describe herein.

In at least one embodiment, processor(s) 502 is/are at least one hardware processor configured to execute various tasks, operations and/or functions for computing device 500. Processor(s) 502 (e.g., a hardware processor) can execute any type of instructions associated with data to achieve desired operations. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, optical ports, and/or any other I/O port(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof, and/or the like to facilitate various operations for embodiments described herein.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software (potentially inclusive of object code and source code), etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may operate in conjunction with one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In sum, a method is provided and includes receiving differential optical signals, converting, with photodetectors, the differential optical signals to differential current signals representative of the differential optical signals, converting, using a transimpedance amplifier, the differential current signals to differential intermediate voltage signals, amplifying, using a main amplifier, the differential intermediate voltage signals to generate differential output voltage signals, and cancelling a DC component of the differential output voltage signals using a fully differential DC cancellation circuit.

The method may also include regulating, fully differentially, common-mode voltage of the differential intermediate voltage signals.

In an embodiment, regulating comprises detecting common mode voltage at both an input and an output of the transimpedance amplifier.

The method may still further include detecting the common mode voltage at the input of the transimpedance amplifier using a voltage divider spanning inputs to the transimpedance amplifier.

The method may also include detecting the common mode voltage at the output of the transimpedance amplifier using a voltage divider spanning outputs of the transimpedance amplifier.

In an embodiment, the method includes feeding back the differential output voltage signals to the fully differential DC cancellation circuit via low pass filters.

The method may also include averaging, using capacitors, the DC component of the differential output voltage signals.

The method may still further include controlling transistors, which shunt photocurrent from the differential current signals, based on the DC component of the differential output voltage signals.

And, the method may still further include adjusting a residual-voltage offset between the differential output voltage signals by applying a selectable voltage to a first transistor of a differential pair of transistors while a second transistor of the differential pair of transistors is biased at a predetermined set voltage.

In another embodiment, a method includes converting, using a transimpedance amplifier, differential current signals to differential intermediate voltage signals, amplifying, using a main amplifier, the differential intermediate voltage signals to generate differential output voltage signals, cancelling a DC component of the differential output voltage signals using a fully-differential DC cancellation circuit, and regulating, fully differentially, common-mode voltage between an input of the transimpedance amplifier and an output of the transimpedance amplifier.

In the method, the regulating may include detecting common mode voltage at both an input and an output of the transimpedance amplifier.

The method may also include detecting the common mode voltage at the input of the transimpedance amplifier using a voltage divider spanning inputs to the transimpedance amplifier.

The method may still further include detecting the common mode voltage at the output of the transimpedance amplifier using a voltage divider spanning outputs of the transimpedance amplifier.

The method may also include feeding back the differential output voltage signals to the fully differential DC cancellation circuit via low pass filters.

The method may still also include averaging, using capacitors, the DC component of the differential output voltage signals.

And the method may include controlling transistors, which shunt photocurrent from the differential current signals, based on the DC component of the differential output voltage signals.

In still another embodiment, an apparatus is provided. The apparatus includes a pair of photodetectors, a transimpedance amplifier in communication with the photodetectors, a main amplifier in communication with the transimpedance amplifier, and a fully-differential DC cancellation circuit in communication with an output of the main amplifier, the fully differential DC cancellation circuit comprising a pair of transistors that, responsive to an output of the main amplifier, shunts photocurrent generated by the photodetectors away from an input to the transimpedance amplifier.

The apparatus may further include low pass filters disposed between the output of the main amplifier and the fully-differential DC cancellation circuit.

The apparatus may also include a residual offset-voltage adjustment circuit comprising a pair of differential transistors that controls a voltage offset of the output of the main amplifier.

And, in the apparatus embodiment, a first transistor of the differential pair of transistors is selectably controllable and a second transistor of the differential pair of transistors is biased at a predetermined set voltage.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

receiving differential optical signals;

converting, with photodetectors, the differential optical signals to differential current signals representative of the differential optical signals;

converting, using a transimpedance amplifier, the differential current signals to differential intermediate voltage signals;

amplifying, using a main amplifier, the differential intermediate voltage signals to generate differential output voltage signals;

cancelling a DC component of the differential output voltage signals using a fully differential DC cancellation circuit; and regulating, fully differentially, common-mode voltage of the differential intermediate voltage signals by detecting common mode voltage at both an input and an output of the transimpedance amplifier using, at least, a voltage divider spanning inputs to the transimpedance amplifier.

2. The method of claim 1, further comprising detecting the common mode voltage at the output of the transimpedance amplifier using a voltage divider spanning outputs of the transimpedance amplifier.

3. The method of claim 1, further comprising feeding back the differential output voltage signals to the fully differential DC cancellation circuit via low pass filters.

4. The method of claim 1, further comprising averaging, using capacitors, the DC component of the differential output voltage signals.

5. The method of claim 1, further comprising controlling transistors, which shunt photocurrent from the differential current signals, based on the DC component of the differential output voltage signals.

6. The method of claim 1, further comprising adjusting a residual-voltage offset between the differential output voltage signals by applying a selectable voltage to a first transistor of a differential pair of transistors while a second transistor of the differential pair of transistors is biased at a predetermined set voltage.

7. A method comprising:

converting, using a transimpedance amplifier, differential current signals to differential intermediate voltage signals;

amplifying, using a main amplifier, the differential intermediate voltage signals to generate differential output voltage signals;

cancelling a DC component of the differential output voltage signals using a fully-differential DC cancellation circuit;

regulating, fully differentially, common-mode voltage between an input of the transimpedance amplifier and an output of the transimpedance amplifier; and detecting common mode voltage at both an input and an output of the transimpedance amplifier using a voltage divider spanning outputs of the transimpedance amplifier.

8. The method of claim 7, further comprising detecting the common mode voltage at the input of the transimpedance amplifier using a voltage divider spanning inputs to the transimpedance amplifier.

9. The method of claim 7 further comprising feeding back the differential output voltage signals to the fully-differential DC cancellation circuit via low pass filters.

10. The method of claim 7, further comprising controlling transistors, which shunt photocurrent from the differential current signals, based on the DC component of the differential output voltage signals.

11. An apparatus comprising:

a pair of photodetectors;

a transimpedance amplifier in communication with the photodetectors;

a main amplifier in communication with the transimpedance amplifier;

a fully-differential DC cancellation circuit in communication with an output of the main amplifier, the fully-differential DC cancellation circuit configured to cancel a DC component of the output of the main amplifier by processing signals from an input and an output of the transimpedance amplifier and from an output of the main amplifier; and a residual offset-voltage adjustment circuit comprising a pair of differential transistors that controls a voltage offset of the output of the main amplifier.

12. The apparatus of claim 11, further comprising low pass filters disposed between the output of the main amplifier and the fully-differential DC cancellation circuit.

13. The apparatus of claim 11, wherein a first transistor of a differential pair of transistors is selectably controllable and a second transistor of the differential pair of transistors is biased at a predetermined set voltage.

14. The apparatus of claim 11, wherein the fully-differential DC cancellation circuit comprises a pair of transistors that, responsive to an output of the main amplifier, shunts photocurrent generated by the photodetectors away from an input to the transimpedance amplifier.

* * * * *